United States Patent [19]

Petiet

[11] Patent Number: 4,567,218

[45] Date of Patent: Jan. 28, 1986

[54] HALOGENATED BISPHENOL A ETHER FLAME RETARDANT FOR ABS POLYMERS

[75] Inventor: Thomas J. Petiet, Greenville, N.Y.

[73] Assignee: Great Lakes Chemical Corporation, West Lafayette, Ind.

[21] Appl. No.: 706,384

[22] Filed: Feb. 27, 1985

Related U.S. Application Data

[63] Continuation of Ser. No. 575,786, Feb. 1, 1984, abandoned, which is a continuation of Ser. No. 520,538, Aug. 5, 1983, abandoned, which is a continuation of Ser. No. 414,454, Sep. 2, 1982, abandoned, which is a continuation-in-part of Ser. No. 48,570, Jun. 14, 1979, abandoned.

[51] Int. Cl.$^4$ ............................................... C08K 5/06
[52] U.S. Cl. ................................... 524/373; 524/411; 524/412
[58] Field of Search ...................... 524/373, 411, 412

[56] References Cited

U.S. PATENT DOCUMENTS 4,058,501  11/1977  Anderson .......................... 524/373

FOREIGN PATENT DOCUMENTS 49-103842  10/1974  Japan ................................. 524/373
49-146714   6/1976  Japan ................................. 524/373

OTHER PUBLICATIONS

Chang et al: J. Applied Polymer Sci., vol. 21, 2167–80, (1977).
Howarth et al: Plastics World, Mar. 1973, 65–72.
Lyons, J. W.: The Chemistry & Uses of Fire Retardants, 281–290, (1970).
Stille, J. K.: Introd. to Polymer Chemistry, 19 and 20, (1962).
Modern Plastics Encyclopedia, 1983–84, 616–620.
Encyclopedia of Polymer Sci. & Tech., vol. 7, 9 to 16, 1967, John Wiley & Sons, Inc.

*Primary Examiner*—Veronica P. Hoke
*Attorney, Agent, or Firm*—Kirkland & Ellis

[57] ABSTRACT

There is disclosed a flame-retarded acrylonitrile-butadiene-styrene composition containing from about 5 to about 35 percent (by weight) bis(2,4,6-tribromophenoxyethyl) tetrabromobisphenol A ether and a method for forming such a composition.

3 Claims, No Drawings

HALOGENATED BISPHENOL A ETHER FLAME RETARDANT FOR ABS POLYMERS

CROSS REFERENCE

This is a continuation of co-pending application Ser. No. 575,786 filed on Feb. 1, 1984, now abandoned which is a continuation of Ser. No. 520,538, filed on Aug. 5, 1983, now abandoned, which is a continuation of Ser. No. 414,454, filed Sept. 2, 1982, now abandoned, which is a continuation-in-part of Ser. No. 048,570, filed June 14, 1979, now abandoned.

BACKGROUND OF THE INVENTION

1. Field of Invention

The present invention relates to a flame-retarded acrylonitrile-butadiene-styrene composition containing bis(2,4,6-tribromophenoxyethyl)tetrabromobisphenol A ether.

2. Description of the Prior Art

Acrylonitrile-butadiene-styrene ("ABS") thermoplastics offer a good balance of physical and mechanical properties such as good abuse resistance, heat resistance, moldability, stain resistance, chemical resistance, and surface hardness. Because of their properties and their moderate cost, they have been chosen for use in a wide range of applications. They are used by telephone and automotive manufacturers who require materials with high impact strength. Manufacturers of boats utilize these materials because of their high strength-to-weight ratios and their deep draw thermoformabilities. Manufacturers of luggage, appliances, sporting goods, safety equipment, and toys utilize these materials because of their light weights and their flexural and high impact properties.

ABS plastics are derived from acrylonitrile, butadiene, and styrene. The general chemical structure for these plastics is

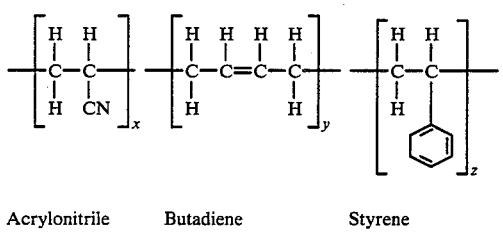

Acrylonitrile    Butadiene    Styrene wherein x, y, and z (which may be the same or different) are from about 10 to about 1,500. Some of the properties of typical ABS plastics are described on pages 1-64, 1-66, and 1-68 of Charles A. Harper's "Handbook of Plastics and Elastomers" which was published by the McGraw-Hill Book Company in 1975; these pages are hereby incorporated by reference into this application.

ABS plastics are widely used by manufacturers of business machines, building components, television components, and institutional products. For many of these uses the ABS plastic must be flame-retarded.

Many flame retardants have been described by the prior art. Some relevant prior art references which describe such flame retardants include, e.g., German Pat. No. 2731817 (which describes a bromobisphenol ether fireproofing agent); Japanese Pat. No. 51-117737 (a copolymer derived from bromobisphenol A which is used to flame-retard polyolefin); and Japanese Pat. No. 49-20155 (a bromoalkyl ether of polybrominated bisphenol A which is useful in flame-retarding polyolefins). Japanese Pat. No. 51-73548 discloses a thermoplastic polymer composition containing a halogenated bisphenylene ether fireproofing agent. Among the many agents encompassed within the broad generic teaching of the reference there is included the compound employed in the composition claimed herein. The reference does not, however, discuss flame retarding ABS plastics, nor does it teach the surprising compatibility of the fireproofing compound in ABS plastics or the improved impact resistance thereof.

SUMMARY OF THE INVENTION

The objects, advantages and features of the present invention may be achieved with a flame-retarded acrylonitrile-butadiene-styrene composition comprising from about 5 to about 35 percent (by weight) bis(2,4,6-tribromophenoxyethyl)tetrabromobisphenol A ether and preferably from about 1 to about 10 percent (by weight) of an enhancing agent, preferably antimony trioxide.

In its method aspects, this invention permits flame retarding ABS plastics by incorporating therein from about 5 to about 35 percent (by weight) bis(2,4,6-tribromophenoxyethyl)tetrabromobisphenol A ether and preferably about 1 to about 10 percent (by weight) of an enhancing agent, preferably antimony trioxide.

DETAILED DESCRIPTION OF THE INVENTION

In accordance with this invention, there is provided an ABS plastic composition containing bis(2,4,6-tribromophenoxyethyl)tetrabromobisphenol A ether (alternatively denominated the bis(2,4,6-tribromophenoxyethyl)ether of tetrabromobisphenol A or bis(ethoxy-2,4,6-tribromophenyl)tetrabromobisphenol A ether) which imparts flame-retardancy to the ABS plastic and is compatible therewith.

The compound of this invention may be prepared by the following reaction scheme:

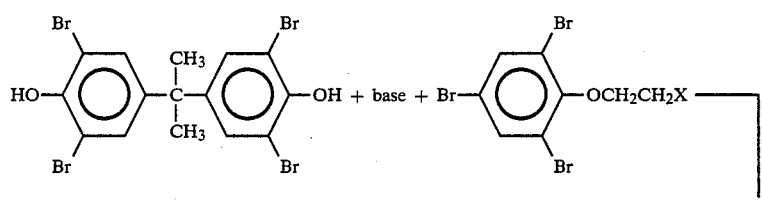

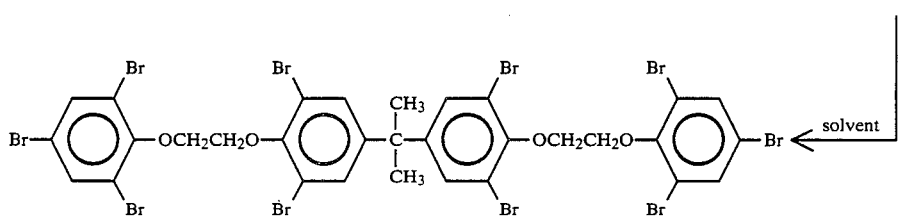

where X is selected from the group consisting of fluorine, chlorine, bromine and iodine.

In a first embodiment of this process, 2-haloethyl-2,4,6-tribromophenyl ether is prepared separately and is then reacted with the base and tetrabromobisphenol A (alternatively denominated 4,4'-isopropylidene-2,2',6,6'-tetrabromodiphenol). In this embodiment, 2-haloethyl-2,4,6-tribromophenol ether may be prepared by reacting 2,4,6-tribromophenol with an ethylene dihalide in accordance with the following reaction scheme:

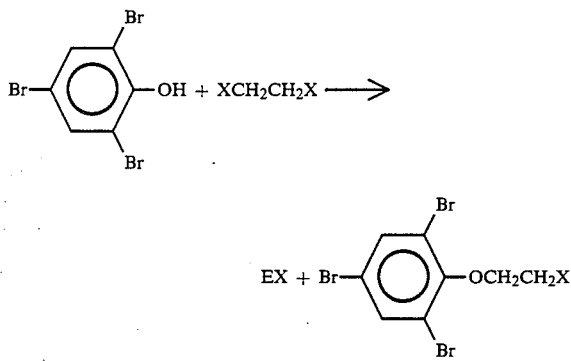

In this reaction, from about 1 to about 10 moles of ethylene dihalide per mole of tribromophenol is utilized. A reaction time of from about 30 to about 600 minutes is preferred. It is more preferred to utilize a reaction time from about 60 to about 300 minutes, and it is most preferred to use a reaction time of from about 60 to about 180 minutes. It is preferred to conduct the reaction at atmospheric pressure, although superatmospheric pressure and subatmospheric pressure also may be used.

It is preferred to use at least about two moles of 2-haloethyl-2,4,6-tribromophenyl ether per mole of tetrabromobisphenol A in the process of this invention. One may charge two moles of 2-haloethyl-2,4,6-tribromophenyl ether per mole of tetrabromobisphenol A to the reaction vessel together with the base and with tetrabromobisphenol A.

Alternatively and preferably, in a second embodiment of the process for preparing the compound of this invention, one may charge the aforementioned tribromophenol and ethylene dihalide to the reaction vessel together with the base to form 2-haloethyl-2,4,6-tribromophenyl ether in situ and have it react with the base and tetrabromobisphenol A.

In this second embodiment, from about 2 to about 15 moles of the aforementioned tribromophenol per mole of tetrabromobisphenol A are charged to the reaction vessel. It is preferred to use a substantially stoichiometric amount of the tribromophenol.

From about 1 to about 10 moles of ethylene dihalide per mole of tribromophenol are used in this second embodiment. It is preferred to use from about 2 to about 4 moles of ethylene dihalide per mole of tribromophenol; it is most preferred to utilize about 3 moles of ethylene dihalide per mole of tribromophenol.

In this second embodiment, a reaction time of from about 30 to about 600 minutes is used to form 2-haloethyl-2,4,6-tribromophenyl ether. It is preferred to utilize a reaction time of from about 60 to about 300 minutes, and it is more preferred to use a reaction time of from about 60 to about 180 minutes. The reaction is generally conducted at atmospheric pressure, although superatmospheric pressure and subatmospheric pressure also may be used. In the preferred embodiment, the resultant 2-haloethyl-2,4,6-tribromophenyl ether is separated from the excess ethylene dibromide by distitllation under vacuum.

The reaction conditions utilized for the first embodiment and second embodiment processes are substantially the same once 2-haloethyl-2,4,6-tribromophenyl ether has been formed. Tetrabromobisphenol A, 2-haloethyl-2,4,6-tribromophenyl ether, and the base are reacted at a temperature of from about 60 to about 200 degrees centigrade for from about 30 to about 300 minutes. In a preferred embodiment, a reaction temperature of from about 125 to about 175 degrees centigrade is used for a period of from about 60 to about 180 minutes. In a more preferred embodiment, a reaction temperature of about 150 degrees centigrade is utilized for about 120 minutes. The reaction is conducted at atmospheric pressure, although superatmospheric and subatmospheric pressures may be used.

At least about one mole of inorganic base per mole tetrabromobisphenol A is used in the process of this invention to prepare the desired flame retardant compound. It is preferred to use from about 1.0 to about 2.0 moles of base per mole tetrabromobisphenol A in this process. It is preferred to use a base selected from the group consisting of metal carbonates, metal hydroxides, and metal oxides wherein the metal is an alkali metal or an alkaline earth metal selected from the first and second columns of the Periodic Table. The preferred alkali metals of the first column are lithium, sodium, potassium, and rubidium, with sodium and potassium being particularly preferred. Preferred alkaline earth metals of the second column are magnesium, calcium, strontium, and barium. Alkali metal carbonates give excellent results; sodium carbonate is one of the preferred bases.

It is preferred to react tetrabromobisphenol A and 2-haloethyl-2,4,6-tribromophenyl ether and the base in the presence of an organic solvent. However, this reaction may be conducted without an organic solvent. When an organic solvent is used, it is preferred that it have a boiling point of greater than about 120 degrees centigrade. By way of illustration and not limitation, some suitable organic solvents include, e.g., non-fused ring aromatics such as xylene, ethyl benzene, cumene, styrol, dibenzyl, cymene, isopropyl toluene, isocymene, monobromobenzene, dichlorobenzene, and the like; lower haloalkanes and lower haloalkylenes having 1 to 6 carbon atoms such as, e.g., ethylene dibromide, pentachloroethane, tetrachloroethylene, and the like; aliphatic alcohols containing from about 5 to about 15 carbon atoms such as, e.g., methyl amyl alcohol, octyl alcohol, 2-ethyl butanol, and the like; aromatic alcohols containing from about 6 to about 15 carbon atoms such as, e.g., benzyl alcohol, dihydric aliphatic alcohols containing from about 1 to 10 carbon atoms such as, e.g., ethylene glycol, propylene glycol, and the like; ketones containing at least about 5 carbon atoms such as, e.g., methyl butyl ketone, methyl amyl ketone, butyrone, mesityl oxide, phenyl methyl ketone, and the like; ethers containing from about 3 to about 15 carbon atoms such as, e.g., the monomethyl ether of ethylene glycol, the monoethyl ether of ethylene glycol, diethylene glycol, the monobutyl ether of diethylene glycol, the monoethyl ether of diethylene glycol, and the like; esters containing from about 5 to about 15 carbon atoms such as, e.g., amyl formate, hexalin formale, hexalin acetate, heptalin formale, heptalin acetate, normal butyl acetate, methyl amyl acetate, octyl acetate, 2-ethyl butyl acetate, methyl cyclohexanol acetate, benzyl acetate, ethylene glycol monoacetate, ethylene glycol diacetate, n-butyl propionate, amyl propionate, ethl butyrate, n-butyl butyrate, ethyl hydroxy-isobutyrate, isobutyl lactate, methyl cyclohexanol lacetate, and the like, dimethyl formamide, dimethyl sulfoxide; and other organic solvents known to those in the art with boiling points in excess of 120 degrees centigrade.

In another preferred embodiment one may react tetrabromobisphenol A and 2-haloethyl-2,4,6-tribromophenyl ether and the base in the presence of water. When water is used as the solvent, it is preferred to conduct the reaction in the presence of a phase transfer catalyst. Any of the phase transfer catalysts known to the art may be used.

The novel flame-retarded ABS compositions of this invention contain from about 5 to about 35 percent (by weight) bis(2,4,6-tribromophenoxyethyl)tetrabromobisphenol A ether. It is preferred that said compositions contain from about 10 to about 25 percent (by weight) of said ether.

The flame-retarded ABS compositions of this invention may also contain from about 1 to about 10 percent (by weight) of enhancing agent. The enhancing agents known in the art may be used in the compositions of this invention; some of these are, e.g., the oxides and halides of the metals of groups IVA and VA of the Periodic Table such as the oxides and halides of antimony, bismuth, arsenic, tin, lead, and germanium; antimony oxychloride, antimony chloride, antimony oxide, stannic oxide, stannic chloride, arsenous oxide, arsenous chloride, and the like may be used. Other enhancing agents well known to those skilled in the art are the organic and inorganic compounds of phosphorous, nitrogen, boron, and sulphur; thus, e.g., triphenyl phosphate, ammonium phosphate, zinc borate, thiourea, urea, stannic sulfide, and the like are suitable enhancing agents. The oxides and halides of titanium, vanadium, chromium, and magnesium are also used as enhancing agents as are the hydrates of these compounds; thus, e.g., titanium dioxide, titanium chloride, vanadium pentoxide, chromic bromide, manganous oxide, molybdenum trioxide, ammonium molybdate, stannous oxide hydrate, lead hydrate, and combinations thereof may be used. Many antimony compounds, both organic and inorganic, are useful as enhancing agents; antimony sulfide, sodium antimonite, potassium antimonite, antimony butyrate, antimony valerate, antimony caproate, antimony heptylate, antimony caprylate, antimony pelargonate, antimony caprate, antimony cinnamate, antimony anisate, tris(n-octyl)antimonite, tris(2-ethylhexyl)antimonite, tribenzyl antimonite, trimethylolpropane antimonite, pentaerythritol antimonite, glycerol antimonite, and compounds which on decomposition (as by ignition) yield antimony oxide are well known to the art as enhancing agents.

The preferred enhancing agents are the oxides of antimony, arsenic, and bismuth. The more preferred enhancing agents are the oxides of antimony. The most preferred enhancing agent is antimony trioxide.

It is also within the scope of the present invention to employ other materials in the compositions of the invention where one so desires to achieve a particular end result. Such materials include, without limitation, adhesion promotors; antioxidants; antistatic agents; antimicrobial agents; colorants; other flame retardants (in addition to the flame retarding condensation product described herein); heat stabilizers; light stabilizers; fillers; reinforcing agents; and other materials well known to those skilled in the art which are described, e.g., in Modern Plastics Encyclopedia, Vo. 52, No. 10A, McGraw-Hill, Inc., New York (1975). Said encyclopedia is hereby incorporated in toto by reference into this disclosure.

The above described materials which may be employed in the composition of this invention can be utilized in any amounts which will not substantially adversely affect the properties of the composition. Thus, the amount used can be zero (0) percent, based on the total weight of the composition, up to that percent at which the composition can still be classified as a plastic. In general, such amount will be from about 0 to about 80 percent.

A preferred flame-retardant additive which may be used in the claimed composition contains an enhancing agent in addition to the bis(2,4,6-tribromophenoxyethyl)tetrabromobisphenol A ether. Said ether comprises at least about 50 percent (by weight) of this preferred flame-retardant additive. It is most preferred that the ether comprise at least about 70 percent (by weight) of the flame retardant additive.

The following examples are provided for the purpose of further illustration only and are not intended to be limitative of the invention disclosed. Unless otherwise specified, all parts are by weight, all weights are in grams, all temperatures are in degrees centigrade, and all volumes are in milliliters.

PREPARATION OF THE ETHERS

Example 1

Thirteen and six-tenths grams (0.025 moles) of tetrabromobisphenol A were dissolved in 100 milliliters of dimethylformamide and charged to a 500 milliliter four-neck flask equipped with a stirring rod, thermometer, condenser, addition funnel, and heating means. To this solution were charged 2.65 grams (0.025 moles) of sodium carbonate at a temperature of from about 60 to about 80 degrees centigrade; a vigorous reaction occurred. Thereafter, a solution of 21.9 grams (0.05 moles) of 1-(2,4,6-tribromophenoxy)-2-bromoethane in 100 milliliters of dimethylformamide was added dropwise to the reaction mixture; when the addition of this solution was started, the temperature of the reaction mixture was 98 degrees centigrade. The reaction mixture was heated to a temperature of 100 degrees centigrade for about three hours. About 300 milliliters of water were added to the reaction mixture, and the liquid in the reaction flask was decanted off. Methanol was added to the reaction flask and mixed with the reaction mixtures. A melting point of from about 136–150 degrees centigrade was obtained. This material was recrystallized from a benzene/methanol mixture. Sixteen grams of material with a melting point of 149–151 degrees centigrade were obtained.

Example 2

To a three-liter flask equipped with stirring rod, condenser, and a thermometer were charged 163.2 grams of tetrabromobisphenol A, 31.8 grams of sodium carbonate, and 1,000 milliliters of propylene glycol. The reaction mixture was heated to 100 degrees centigrade, forming the disodium salt of the bisphenol A. To this reaction mixture were added 262.3 grams of 1-(2,4,6-tribromophenoxy)-2-bromoethane. The reaction mixture was then heated to a temperature of 140 degrees centigrade. Thereafter it was cooled, water was added to it, and the mixture was suction filtered. The solid which formed was dissolved in benzene. The benzene solvent was then allowed to evaporate; the solid thus produced was placed in a blender and broken into a fine white powder while acetone was used to slurry the product. The white powder was removed from the solvent by suction filtration and dried in an oven. 293.4 grams of product were obtained in 77.7 percent yield. This product had a melting point of 157–159 degrees centigrade and it contained 66.11 percent of bromine.

Example 3

Thirteen and six-tenths grams (0.025 moles) of tetrabromobisphenol A and 2.65 grams (0.025 moles) of sodium carbonate were reacted in 100 milliliters of dimethylsulfoxide and the resultant solution charged to a 500 milliliter four-necked flask equipped with a stirring rod, thermometer, condenser, addition funnel, and heating means. Thereafter a mixture of 100 milliliters of dimethysulfoxide and 21.9 grams of 1-(2,4,6-tribromophenoxy)-2-bromoethane were added to the reaction mixture. The reaction mixture then was maintained at a temperature of about 110 degrees centigrade for about three hours. The reaction mixture was cooled, and water was added to it. The reaction mixture was suction filtered, and a crude solid with a melting point of from about 135 to about 140 degrees centigrade was obtained. This crude solid was washed in hot acetone, suction filtered, and dried. Twenty-four grams of bis(2,4,6-tribromophenoxyethyl)tetrabromobisphenol-A ether, with a melting point of 156–158 degrees centigrade, were obtained in 76 percent yield. This material contained 61.65 percent bromine. It was subjected to thermogravimetric analyses; it lost 25 percent of its weight at 377 degrees centigrade, 50 percent of its weight at 387 degrees centigrade, and 75 percent of its weight at 395 degrees centigrade.

Example 4

To a one-liter, four-necked flask equipped with a condenser, thermometer, stirring rod, and heating means were charged a mixture of 54.4 grams of tetrabromobisphenol A, 10.6 grams of sodium carbonate, and 300 milliliters of propylene gylcol. The mixture was heated to a temperature of 100 degrees centigrade; a clear, light yellow solution, which indicated the presence of sodium salt of the bisphenol A, was formed. To the reaction mixture were added 125.8 grams of 1-(2,4,6-tribromophenoxy)2-bromoethane. The reaction mixture was heated to a temperature of 140–150 degrees centigrade for about three hours. Thereafter the reaction mixture was cooled to a temperature of 40 degrees centigrade. Five hundred milliliters of water were added to the reaction mixture, then the reaction mixture was filtered. The solid material which had formed was washed with acetone, collected, crushed, blended with acetone, and refiltered; the refiltered material was then dried. 97.2 grams of a material with a melting point of 157–159 degrees centigrade were obtained in 77 percent yield. This material was subjected to thermal gravimetric analyses. It lost 25 percent of its weight at 373 degrees centigrade, 50 percent of its weight at 387 degrees centigrade, and 75 percent of its weight at 394 degrees centigrade.

PREPARATION OF ABS COMPOSITIONS

Example 5

An acrylonitrile-butadiene-styrene composition is prepared by incorporating bis(2,4,6-tribromophenoxyethyl)tetrabromobisphenol A ether into Borg-Warner "GSM 4500", a black base ABS resin available from the Borg-Warner Corporation which has been dried at 180 degrees Fahrenheit for 240 minutes. The aryl ether is admixed with the ABS by addition to a Brabender Prep Center Mixer ("Measuring Head", Model R6, C. W. Brabender Instruments, Inc., South Hackensack, N.J.); the mixer is equipped with a pair of roller-type blades positioned with a head provided with heat transfer means. The resultant mixture is heated to a temperature about 220 degrees centigrade, at this temperature it is in a molten state. The formulation is discharged from the mixer, cooled, and ground into chips. The chips are injection molded in a one-ounce Newbury Injection Molder (Model HI-30 RS, Newbury Industries, Inc., Newbury, Ohio); a 60 second molding cycle with a ram pressure of 2,000 p.s.i. is utilized; these chips are subjected to heat, melted, and then injected into a mold in order to provide solid samples for testing.

The injection molded samples are tested for Izod impact and heat distortion temperature (unannealed). They are also tested for flammability in accordance with Underwriters' Laboratory Subject No. 94 test (U.L. Tests for Flammability of Plastic Materials, U.L. 94, Feb. 1, 1974). In this test, the test specimen is supported from the upper end, with the longest dimension vertical, by a clamp on a ring stand so that the lower end of the specimen is ⅜" above the top of the burner tube. The burner is then placed remote from the sample, ignited, and adjusted to produce a blue flame ¾" in height. The test flame is placed centrally under the lower end of the test specimen and allowed to remain for 10 seconds. The test flame is then withdrawn and the duration of flaming or glowing combustion of the specimen is noted. If flaming or glowing combustion of the specimen ceases within 30 seconds after removal of the test flame, the test flame is again placed under the specimen for 10 seconds immediately after flaming or glowing combustion of the specimen stops. The test flame is again withdrawn, and the duration of flaming or glowing combustion of the specimen is noted. If the specimen drips flaming particles or droplets while burning in this test, these drippings are allowed to fall onto a horizontal layer of cotton fibers (untreated surgical cotton) placed one foot below the test specimen. Significantly flaming particles are considered to be those capable of igniting the cotton fibers. The duration of flaming or glowing combustion of vertical specimens after application of the test flame (average of 5 specimens with 10 flame applications) should not exceed 25 seconds (maximum not more than 30 seconds) and the portion of the specimen outside the clamp should not be completely burned in the test.

Materials such comply with the above requirements and do not drip any flaming particles or droplets during the burning test are classified as "V-1". Materials which comply with the above requirement but drip flaming particles or droplets which burn briefly during the test are classified as "V-2". A "V-0" rating is given to materials wherein the duration of flaming or glowing combustion averages less than five seconds under the conditions specified above.

Example 6

The procedure described in Example 5 was substantially followed with the exception that the resin used was Marbon's GSM 4500 ABS resin. The concentration of the flame retardant in the ABS composition was 22 percent, and the concentration of antimony trioxide in the composition was 4.4 percent. Compounding was performed on the Brabender Plasticorder (Model PL-V150, C. W. Brabender Instruments, Inc., South Hackensack, N.J., which was equipped with a pair of roller blades) at a temperature of 220 degrees centigrade, a speed of 100 revolutions per minute, and a time of 120 seconds. The resin was first fluxed; flame retardant and antimony trioxide were then added to the resin, and the mixture was fluxed for two minutes. The ground systems were then compression molded into two 3.25"×$\frac{1}{8}$" plaques and one 5.0"×5.5"×$\frac{1}{8}$" plaque; the compression molding occurred at a temperature of 210 degrees centigrade and a force of 20 tons for five minutes. Flammability specimens were cut from the appropriate plaques and determined in accordance with the procedure of Example 5. The composition of this invention had a U.L. 94$\frac{1}{8}$" rating of V-0 and a U.L. 94 1/16" rating of V-0.

PREPARATION OF OTHER FLAME-RETARDED SUBSTRATES

Comparative Example 7

In substantial accordance with the procedure of Example 5, 21.2 percent (by weight) of 1,2-bis(2,6-dibromo-4-t-butylphenoxy)ethane and 4.4 percent (by weight) of antimony trioxide were incorporated into Borg-Warner's Cycolac GSM 4500 black ABS resin. The unannealed heat distortion temperature of this composition was 155 degrees Fahrenheit, the U.L. 94$\frac{1}{8}$" rating was H.B., and the U.L. 94 1/16" rating was H.B.

1,2-bis(2,6-dibromo-4-t-butylphenoxy)ethane contained about 51.5 percent of bromine, about 2.0 percent more bromine than the aryl ether of Example 5. The performance of the flame retardant of Example 5 in ABS was unexpectedly superior to the performance of this compound.

Example 8

In substantial accordance with the procedure described in Example 5, the bis(2,4,6-tribromophenoxyethyl)tetrabromobisphenol A ether of Example 3 was incorporated into acrylonitrile-butadiene-styrene at a concentration of 19 percent (by weight of total composition) along with 3.76 percent (by weight of total composition) of antimony trioxide and 3.23 percent (by weight of total composition) of chlorinated polyethylene. The injection molded samples had an Izod impact of 2.08 foot-pounds per inch (notch), an unannealed heat distortion temperature of 164 degrees Fahrenheit, a U.L. 94$\frac{1}{8}$" rating of V-0, a U.L. 94 1/16" rating of V-0, and a melt index of 8.2 grams per 10 minutes at 220 centigrade under a 5 kilogram load.

Comparative Example 9

To a 2-1 three-necked round-bottomed flask, equipped with a mechanical stirrer, Claisen Y adapter, condensor, graduated addition funnel, thermometer, Thermowatch® unit, and heating mantle were charged 217.4 grams (0.40 mole) of tetrabromobisphenol A and 306.7 grams of ethylene glycol monomethyl ether (Methyl Cellosolve) to form a solution. Sodium carbonate, 42.4 grams (0.40 mole), was added to the solution under agitation and the contents of the flask heated to 120 centigrade. A solution of 64 grams (0.34 mole) ethylene dibromide (EDB) in 207.6 grams of Methyl Cellosolve was added to the reactor and the reaction mixture heated at 120 degrees centigrade under vigorous agitation for 4 hours. To the agitated reaction mixture was then rapidly added 49.9 grams (0.114 mole) of 1-bromo-2 (2,4,6-tribromophenoxy)ethane as a powdered solid, the reaction mixture was heated to reflux and maintained at this temperature for 4 hours.

Upon allowing the reaction mixture to cool overnight a solid had precipitated. This was slurried with the supernatant liquid and the mixture was poured into 1000 milliliters of water under agitation. The white precipitate was filtered from the mother liquor, washed with water and then methanol. It was then dried first in a forced air oven for 16 hours at 60-65 centigrade and finally for 3 hours at 60 Centigrade and 29 inches of mercury vacuum. A total of 246.9 grams of the oligomer of ethylene dibromide and tetrabromobisphenol A terminated with 2,4,6-tribromophenoxy groups was isolated. The organic bromide content of the product was 57.79 percent. Its softening range was 183-205 degrees centigrade. On subjecting the product to thermal gravimetric analysis in nitrogen atmosphere at a heating rate of 20 degrees centigrade per minute, it was found to lose 1 percent of its weight at 271 degrees centigrade, 5 percent at 370 degrees centigrade, 10 percent at 380 degrees centigrade, 25 percent at 387 degrees centigrade, 50 percent at 390 degrees centigrade and 75 percent at 426 degrees centigrade. Gel permeation chromatographic analysis, using a polystrene standard, revealed the oligomer to have a typical bell shaped molecular weight distribution for a polymer that ranged from about 900–5000 grams per mole with a majority of molecular weights distributed between 1300 and 2500. This compound corresponds to the compound disclosed in the second preferred compound on page 3, column 1 of Japanese Pat. No. 5173548 wherein q is principally in the range of about 1 to 3.

In substantial accordance with the procedure described in Example 5, the product of this comparative example was incorporated into acrylontrile-butadiene-styrene at a concentration of 19 percent (by weight of total composition) along with 3.76 percent (by weight of total composition) of antimony trioxide and 3.23 percent (by weight of total composition) of chlorinated polyethylene. The injection molded samples had an izod impact of 0.86 foot-pounds per inch (notch), an unannealed heat distortion temperature of 172 degrees Fahrenehit, a U.L. 94⅛" rating of V-0, a U.L. 94 1/16" rating of V-0, and a melt index of 2.6 grams per 10 minutes at 220 degrees centigrade under a 5 kilogram load.

Comparative Example 10

Into a 2-1 three-necked round-bottomed flask equipped with a mechanical stirrer, Claisen Y adapter, condensor, graduated addition funnel, thermometer, Thermowatch® unit, and heating mantle were charged 217.4 grams (0.40 mole) of tetrabromobisphenol A and 306.7 grams of Methyl Cellosolve. To the resulting solution, formed by agitation of the mixture, was added 42.4 grams (0.40 mole) of sodium carbonate, and the reaction mixture was heated to 120 degrees centigrade under agitation. A solution of 90.2 grams (0.48 mole) of ethylene dibromide in 207.6 grams of Methyl Cellosolve was added and the resultant reactor contents heated for 4 hours at 120 centigrade under good mechanical agitation. To the hot reaction mixture were then charged 39.2 grams (0.118 mole) of 2,4,6-tribromophenol and 9.4 grams (0.089 mole) of sodium carbonate. The reaction mixture under agitation was then heated to reflux, held at this temperature for 4 hours, and then allowed to cool for approximately 16 hours. The precipitate which had formed was slurried with the supernatant, and then filtered, washed with water and finally methanol. The precipitate was initially dried in a forced draft oven at 60 degrees centigrade for 16 hours, then in a vacuum oven at 60 degrees centigrade and 29 inches of mercury vacuum for 3 hours. The weight of the product, a white powder, was 275.6 grams. Its organic bromide content was 52.10 percent and it had a softening range of 197-244 degrees centigrade. The respective temperatures at which it lost 1, 5, 10, 25, 50 and 75 percent weight in a thermogravimetric analysis in nitrogen at a heating rate of 20 degrees centigrade per minute were 113, 379, 388, 397, 401, 426. Gel permeation chromatographic analysis of the oligomer using polystyrene standard revealed the product to have a broad molecular weight distribution from about 1200 to 30,000 grams per mole with a predominate molecular weight distribution between about 1600 to 8700. This compound corresponds to the compound disclosed in the second preferred compound on page 3, column 1 of Japanese Pat. No. 5173548 wherein q is principally in the range of about 7 to 10.

In substantial accordance with the procedure described in Example 5, the product of this example was incorporated into acrylonitrile-butadiene-styrene at a concentration of 19 percent (by weight of total composition) along with 3.76 percent (by weight of total composition) of antimony trioxide and 3.23 percent (by weight of total composition) of chlorinated polyethylene. The injection molded samples had an Izod impact of 0.84 foot-pounds per inch (notch), an unannealed heat distortion temperature of 173 degrees Fahrenheit, a U.L. 94⅛" rating of V-0, a U.L. 94 1/6" rating of V-0, and a melt index of 0.8 grams per 10 minutes at 220 centigrade under a 5 kilogram load.

The findings of Example 8 and Comparative Examples 9 and 10 are summarized in Table 1 and reveal the surprising compatability of the fireproofing compound in ABS plastics and the much improved impact resistance of the claimed composition when compared with the prior art compositions.

TABLE 1

| Composition | Izod Impact[1] | Gardner Impact[2] | HDI[3] | MI[4] |
|---|---|---|---|---|
| Example 8 | 2.08 | 15-20 | 164 | 8.2 |
| Comparative Example 9 | 0.86 | 5 | 172 | 2.6 |
| Comparative Example 10 | 0.84 | 5-10 | 173 | 0.8 |

[1]Izod Impact; notched specimens, ft-lb. ASTM D256
[2]Gardener Impact; in.-lb., ring intact
[3]Heat Distortion Temperature: unannealed, 264 psi, °F., ASTM D648
[4]Melt Index: g./10 min., at 220° C. and 5 kg load, ASTM D1238.

The above examples have been described for the purposes of illustration and not limitation. Many other modifications will suggest themselves to those skilled in the art; they are intended to be comprehended within the scope of this invention.

I claim:

1. A flame-retardant acrylonitrile-butadiene-styrene copolymer composition comprising said copolymer and from about 5 to about 35 percent by weight of the total composition of bis(2,4,6-tribromophenoxyethyl)tetrabromobisphenol A ether.

2. A composition, as claimed in claim 1, and further comprising from about 1 to about 10 percent by weight of the total composition of a fire retardant enhancing compound selected from the group consisting of those compounds containing either metal, boron, phosphorus, nitrogen or sulfur.

3. A composition, as claimed in claim 2, wherein the enhancing agent is antimony trioxide.

* * * * *